United States Patent [19]

Makhlouf

[11] 3,876,603

[45] Apr. 8, 1975

[54] METHOD OF ENCAPSULATING PIGMENTS IN ORGANIC DISPERSIONS OF POLYMERS

[75] Inventor: Joseph M. Makhlouf, Mars, Pa.

[73] Assignee: PPG Industries, Inc., Pittsburgh, Pa.

[22] Filed: June 22, 1970

[21] Appl. No.: 48,507

[52] U.S. Cl. ... 260/31.2 N; 106/308 M; 260/31.4 R; 260/31.6; 260/32.8 N; 260/33.6 UA; 260/34.2; 260/42; 260/42.21; 260/42.22
[51] Int. Cl. .................... C08f 45/42; C08f 45/34
[58] Field of Search.. 106/308 M; 260/34.2, 31.2 N, 260/31.4 R, 31.6, 32.8 N

[56] References Cited
UNITED STATES PATENTS

| | | | |
|---|---|---|---|
| 2,636,872 | 4/1953 | James et al. | 260/33.6 |
| 3,166,524 | 1/1965 | Schmidle et al. | 260/23 |
| 3,325,443 | 6/1967 | Christenson et al. | 260/41 |
| 3,433,753 | 3/1969 | Farkas et al. | 260/22 |
| 3,446,769 | 5/1969 | Opipari | 260/31.4 |
| 3,505,268 | 4/1970 | Backhouse et al. | 260/31.2 |
| 3,514,500 | 5/1970 | Osmond et al. | 260/874 |
| 3,575,400 | 4/1971 | Ponyik | 106/308 M |

Primary Examiner—Donald E. Czaja
Assistant Examiner—H. H. FLetcher
Attorney, Agent, or Firm—George D. Morris

[57] ABSTRACT

A method of encapsulating pigments with a protective coating comprises (1) polymerizing at least one ethylenically unsaturated monomer in an active solvent for the polymer alone or in conjunction with a dispersing liquid of aliphatic hydrocarbon in the presence of a polymerizable ethylenically unsaturated carboxylic acid, an imine, and a dispersion stabilizer which is a branched copolymer having two types of polymeric components of which one type is solvated by both the dispersing liquid and the active solvent while the other type is an anchor polymer of different polarity to the first type and being relatively non-solvatable by the dispersing liquid, when present, and being capable of being anchored to the polymerized particles of the ethylenically unsaturated monomer and said anchor polymer containing pendant groups capable of copolymerizing with ethylenically unsaturated monomer, (2) grinding pigment and inserting in the above composition, and (3) adding non-active solvent (dispersing liquid) to obtain a dispersion of pigments encapsulated by acrylic polymer coatings.

6 Claims, No Drawings

METHOD OF ENCAPSULATING PIGMENTS IN ORGANIC DISPERSIONS OF POLYMERS

In the formation of paints and coating compositions using various pigments, problems arise because of the reactivity of the pigments with other components of the coating, mar resistance of the coating, durability, chalking of the coating, and the hiding power of the coating. To offset these problems, it is desirable to apply a protective coating to the pigment. This is quite difficult as each pigment must be completely coated discrete from one another.

A new method of encapsulating pigments with acrylic coatings has now been discovered which will achieve greater durability, mar resistance, and hiding power of coatings containing these pigments. Also the mar resistance of the coating will be enhanced and the reactivity of the pigments will be destroyed. This method entails forming a pseudo-dispersion of acrylic particles with the pigments and inverting the pseudo-dispersion to a real dispersion with aliphatic hydrocarbons to form pigments encapsulated with the acrylic polymer.

This invention encompasses the grinding of pigments in a pseudo-dispersion of acrylic particles.

The pseudo-dispersion of acrylic particles is fully described in copending application Ser. No. 48,210 filed June 22, 1970 now U.S. Pat. No. 3,686,111.

The pseudo-dispersion in which the pigments are dispersed contains acrylic polymer particles, an active solvent for said polymer particles, an aliphatic hydrocarbon non-solvent, imine-modified carboxylic acid, and a specific dispersion stabilizer.

In general, the process for making dispersions of acrylic polymers in organic solvents is by dispersion polymerizing acrylic monomer in an organic liquid in which it is soluble, but in which the resulting polymer is insoluble and forms disperse polymer particles. The reaction is carried out in the presence of a stabilizer having in its molecule (i) a constituent which becomes associated with the disperse polymer particles and (ii) a constituent having a pendent chain-like structure which is solvated by the organic liquid and provides a stabilizing sheath around the polymer particles.

The process for preparing solutions of acrylic polymers is simply by polymerizing the acrylic monomer or monomers in an active solvent for the polymer.

The novel process for preparing the encapsulating dispersant of this invention is to polymerize an acrylic monomer or monomers in the presence of an imine and a polymerizable carboxylic acid which will react with the imine and a particular dispersion stabilizer in an active solvent for the acrylic polymer with or without an aliphatic hydrocarbon (non-active solvent). The resulting encapsulating liquid is then either a solvent solution or a "pseudo-dispersion" if non-active solvents were added prior to the polymerization.

By "pseudo-dispersion," it is meant that the composition has become properties of a solution such as high viscosity for grinding purposes yet it can be easily formed into a dispersion by the addition of non-active solvents. The acrylic polymers particles are, however, not truly in solution. The acrylic polymer particles in the pseudo-dispersion are not coalesced as in solution polymers and are not fully discrete from one another as in true dispersions. These particles are only partially coalesced. In the pseudo-dispersion of this invention, the turbidity is much greater than that of a solution polymer of the same general composition yet is much lower than that of a dispersion polymer of the same general composition.

The preferred method of forming the encapsulating polymer is by heating the active solvent and then adding the acrylic monomer, aliphatic hydrocarbon, if desirable, stabilizer, imine, and carboxylic acid over a period of time. However, the materials may all be added at the same time or at different times during the polymerization.

The polymerizable acrylic monomer or monomers which are polymerized in the process of this invention may be any ethylenically unsaturated monomer such as methyl methacrylate, ethyl acrylate, styrene, butyl acrylate, 2-hydroxy ethyl acrylate methacrylate, 2-hydroxypropyl acrylate and methacrylate, 2-ethyl hexyl acrylate and methacrylate, acrylonitrile, acrylamide, acrylic acid, methacrylic acid, vinyl toluene, and many others. A more complete description of these monomers may be found in U.S. Pat. No. 3,037,963. A particularly preferred ethylenically unsaturated monomer to be polymerized is methyl methacrylate. Examples of liquid aliphatic hydrocarbon solvents useful herein are pentane, hexane, heptane, octane mixtures of the above, and the like.

The active solvent used along with the aliphatic hydrocarbon must be one which is capable of dissolving the acrylic polymer. Solvents which are active with respect to acrylic polymers are well known and some examples of conventional active solvents are Cellosolve acetate (ethylene glycol monoethyl ether acetate), 2,2-,4-trimethyl-1,3-pentanediol monisobutyrate (hexanol), butyl Carbitol diethylene glycol monbutyl ether acetate, acetone, ethyl acetate, butyl acetate, toluene, methyl ethyl ketone, methyl isobutyl ketone, methyl isoamyl ketone, and the like.

The polymerizable ethylenically unsaturated carboxylic acid may be any acidic acrylic compound such as acrylic acid, methacrylic acid, crotonic acid, 3-butenoic acid, itaconic acid, and the like. This acid reacts with the imine component.

The imine, in turn, may be any imine-containing compound which will react with the carboxylic acid.

Any imine-containing compound which will react with a carboxylic acid may be used. Generally, the imine-containing compounds are the alkylene imines and substituted alkylene imines. The preferred class of such imines are of the formula:

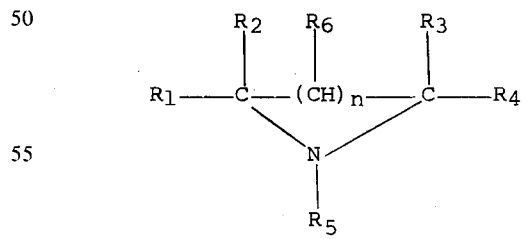

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; alkaryl, such as tolyl, xylyl or the like, or aralkyl, such as benzyl, phenethyl, or the like. $R_6$ in the above formula is hydrogen or a lower alkyl radical usually having not more than about 6 carbon atoms, and $n$ is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkyleneimine (whether or not within the above formula) does not depend upon the particular nature of any of the substituents, but rather the imine linkage; thus, beneficial results are obtained with interpolymers modified by any of those compounds within the above class.

A number of specific examples of alkyleneimines within the class described are as follows:

Ethylenimine (aziridine)
1,2-propylenimine (2-methyl aziridine)
1,3-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl aziridine)
3-chloropropyl ethylenimine (2-(3-chloropropyl)aziridine)
p-chlorophenyl ethylenimine (2-(4-chlorophenyl)aziridine)
Methoxyethyl ethylenimine (2-(2-methoxyethyl)aziridine)
Dodecyl aziridinyl formate (dodecyl 1-aziridinyl carboxylate)
Carbethoxyethyl ethylenimine (2-(2-carbethoxyethyl)aziridine)
N-ethyl ethylenimine (1-ethyl aziridine)
N-butyl ethylenimine (1-butyl aziridine)
N-(2-aminoethyl)ethylenimine (1-(2-aminoethyl)aziridine)
N-(phenethyl)ethylenimine (1-(2-phenylethyl)aziridine)
N-(2-hydroxyethyl)ethylenimine (1-(2-hydroxyethyl)aziridine)
N-(cyanoethyl) ethylenimine (1-cyanoethyl aziridine)
N-phenyl ethylenimine (1-phenyl aziridine)
N-tolyl ethylenimine (1-(2-methylphenyl)aziridine)
N-(p-chlorophenyl)ethylenimine (1-(4-chlorophenyl)aziridine)

Because of their availability and because they have been found to be among the most effective, the preferred imines are alkyleneimines and substituted alkyleneimines having 2 to 4 carbon atoms, and especially ethylenimine, 1,2-propylenimine, and N-hydroxyethyl ethylenimine.

The dispersion stabilizer used in this invention is a branched copolymer comprising two types of polymer components of which one segment is solvated by the aliphatic hydrocarbon solvent and not associated with polymerized particles of the polymerizable ethylenically unsaturated monomer and the second type is an anchor polymer of different polarity to the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The dispersion stabilizer comprises two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally the solvatable segment (A) is a monofunctional polymeric material of molecular weight of about 300 to about 3,000. These polymers may be made, for example, by condensation reaction producing a polyester or polyether. Preferably the polyester reaction is a simple one involving a mono-hydroxylic moncarboxylic monomer, such reactions leading to components which are strictly monofunctional with respect to one or the other group. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized such as glycidyl acrylate or glycidyl methacrylate. The glycidyl group would react with the carboxyl groups of the polyhydroxy stearic acid and the polymer segment (A) would be formed.

Somewhat more complex, but still useful, polyesters may be made by reacting diacids with diols. For example, 1,12-decanediol may be reacted with sebacic acid or its diacid chloride to form a component solvatable by aliphatic hydrocarbons.

The preferred polymeric segment (A) of the dispersion stabilizer is formed by reacting poly-12-hydroxy stearic acid with glycidyl methacrylate.

The second polymeric segment (B) of the dispersion stabilizer is of different polarity to the first segment (A) and, as such, is relatively non-solvated by the dispersing liquid and is associated with or capable of anchoring on to the acrylic polymeric particles formed by the polymerization and contains a pendant group which is copolymerizable with the acrylic monomer. This anchor segment (B) provides around the polymerized particles a layer of the stabilizer. The solvated polymer segment (A) of which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic and methacrylic esters such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically unsaturated acids such as acrylic acid, methacrylic acid, 3-butenoic acid, crotonic acid, itaconic acid, and the like, which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually separated entities, the segment (A) being attached to the backbone of the graft copolymer and the segment (B) being carried in or on the backbone. However, in some cases the segments (A) and (B) may be attached one to the other. For example, segment (A) may be attached to segment (B) by ionized ionic linkages.

The imine component which reacts with the carboxylic acid component may be added before, during, or after the polymerization of the acrylic monomer. While often the imine reaction is carried out after the polymer has been produced, it has been found that some saving of time without any sacrifice in properties is achieved by carrying out the reaction with imine concurrently with the interpolymerization reaction. In this embodiment, the imine is added to the polymerization mixture at any point prior to the completion of the polymerization reaction. Preferably, the imine is added after the monomers, but before the polymerization is substantially advanced.

The polymerization reaction is otherwise carried out in conventional manner, utilizing heat and/or catalysts and varying solvents and techniques. Generally, a free-radical catalyst, such as cumene hydroperoxide, benzoyl peroxide or similar peroxygen compound, or an azo compound, is employed. When the polymerization reaction and the reaction with imine are conducted concurrently as described above, azo compounds, and especially alpha,alpha-azobis(isobutyronitrile), are preferred as the catalyst.

The dispersant preferably contains from about 1 to about 40 percent by weight of the dispersion stabilizer based on the weight of the ethylenically unsaturated monomer from about 0.2 to about 6 percent by weight of the ethylenically unsaturated carboxylic acid based on the ethylenically unsaturated monomer, from about 0.2 to about 6 percent by weight of imine based on the ethylenically unsaturated monomer and the aliphatic hydrocarbon solvent, if present, preferably comprises from about 10 to about 50 percent of the entire solvent composition and the active solvent preferably comprises from about 50 to about 90 percent by weight of the entire solvent composition. The pseudo-dispersion, which yields the best properties for dispersing pigment contains about 6.6 percent by weight of the dispersion stabilizer based on the ethylenically unsaturated monomer, about 0.75 percent by weight of the carboxylic acid and about 0.75 percent by weight of the imine, both based on the ethylenically unsaturated monomer and the entire pseudo-dispersion containing about 19 percent by weight of the aliphatic hydrocarbon solvent and about 42 percent by weight of the active solvent. The composition may contain from about 20 percent solids content to about 60 percent solids content.

If a pseudo-dispersion is to be formed, the amounts of active solvent and liquid aliphatic hydrocarbon must be balanced properly prior to the formation of polymer. The weight ratio of aliphatic hydrocarbon to active solvent in this case is from about 1:1 to about 1:5.

The pigment to be encapsulated may be added either to the polymer solution or the pseudo-dispersion and ground in the solution or pseudo-dispersion in the conventional manner such as in a steel ball mill. When grinding the pigment, a wide range of pigment dispersant ratios may be used depending on the type of pigment to be encapsulated, particle size, and the strike layer of polymer desired.

Any pigment may be added to the solvent solution or pseudo-dispersion to be encapsulated thereby. The preferable pigments are titanium dioxide, aluminum, zinc oxide, zinc chromate, and the like.

The pigments are encapsulated by adding to the pseudo-dispersion pigment grind under high shear rate a sufficient amount of liquid aliphatic hydrocarbon to invert the pseudo-dispersion to a true dispersion wherein the acrylic particles form a continuous coating around each pigment particle.

The amount of liquid aliphatic hydrocarbon to be added to the pseudo-dispersion and pigment to effect the inversion and subsequent encapsulation of the pigments is dependent on the existing ratio of solvent to aliphatic hydrocarbon in the pseudo-dispersion.

Alternatively, the pigments may be encapsulated by adding the pigments to the solution polymer and grinding and then subsequently adding a sufficient amount of liquid aliphatic hydrocarbon to invert the solution to a true dispersion wherein the acrylic particles form a continuous coating around each pigment particle.

It is noted that the result in this case is believed to come about because the pigment form nucleii or sites on which polymer particles deposit. Similar results could not be achieved by merely forming a normal solution polymer which does not contain the imine, acid, and dispersion stabilizer and subsequently adding liquid aliphatic hydrocarbon thereto since it would result in uncontrolled flocculation.

The encapsulated pigments may then be used as a site for further dispersion polymerization of acrylic polymer on the particles. If the original encapsulation is not sufficiently thick to adequately protect the particles, further addition of acrylic monomers may be added to the dispersion of encapsulated pigments and the monomers will polymerize around the pigments further enveloping the pigments.

The final paint composition containing the encapsulated pigments may be adapted to be modified by the incorporation of drying oils, waxes (e.g., hydrocarbon, chlorinated hydrocarbon, and ester types), pigments, filler dyes, as well as plasticizers and polymeric or resinous materials which are soluble in the hydrocarbon liquid vehicle, including fatty-acid modified shellac, gums, natural resins, waxes, asphalt, bitumen, coal tar, cumarone-indene resins, epoxidized fatty oils, epoxy resins, organic solvent-soluble alkylated methylolated aminoplast resins including the condensates of formaldehyde with urea, melamine, thiourea, benzoguanamine, ethylene urea, alkylated with an alcohol having 2 to 6 carbon atoms such as n-butanol. Among other materials that can be incorporated are the alkyds, organic solvent-soluble vinyl and acrylic resins with or without plasticizers, including plastisols obtained from polyvinyl chloride or copolymers of vinyl chloride and plasticizers therefor.

Coating compositions using the encapsulated pigments may be used as coatings for all types of substrates and may be applied using any conventional coating method such as dip coating, roll coating, spraying, etc. They are useful as coatings for a variety of substrates such as textile fabrics, paper, paperboards, leather, wood, metals, ceramics, concrete, bricks, stone, plaster, vinyl materials, linoleum, asphalt tile, and asbestos products. They are especially useful as topcoats for automotive products. Automotive bodies spray coated with these compositions have glossy coatings which are quite durable.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLE 1

A vessel was charged with 1,000 grams of toluene and heated to reflux. To the toluene was then added over a 2-hour period 114 grams of methyl methacrylate, 282 grams of 2-ethyl hexyl acrylate, 11 grams of methacrylic acid, 11 grams of N-(2-hydroxyethyl)ethylene imine, 5.1 grams of azobis-isobutyronitrile, 620 grams of heptane, and 430 grams of a 33 percent solution of a dispersion stabilizer prepared by reacting 50 parts of the reaction product of 9 parts of polyhydroxy stearic acid and 1 part of glycidyl methacrylate with 45 parts of methyl methacrylate and 5 parts of glycidyl methacrylate and reacting the product of that reaction with methacrylic acid. Following the above addition, a solution of 3.4 grams of azobis-isobutyrontile and 225 grams of methyl ethyl ketone were added over a 2-hour period. After an additional 1½ hours at reflux, the reactants were cooled and the resultant polymer was diluted with an additional 225 grams of methyl ethyl ketone. The resulting pseudo-dispersion had a Gardner-Holdt viscosity of UV and a total solids content of 37 percent.

Zinc oxide pigment was dispersed in 137 grams of the above prepared pseudo-dispersion and subjeced to high shear. Thirty grams of VM&P naphtha were then added slowly to the pigment pseudo-dispersion causing an inversion and a corresponding drop in viscosity. The product was dried and then slurried in dilute hydrochloric acid for 1 hour and was recovered from the acid with only a 10 percent loss in weight. On the other hand, unencapsulated zinc oxide was slurried in dilute hydrochloric acid and was totally dissolved therein.

EXAMPLE 2

A solution polymer was formed by polymerizing 655 grams of methyl methacrylate, 65.5 grams of butyl acrylate, 5.5 grams of methyl methacrylate acid, 5.5 grams of 2-hydroxyethyl ethylene imine and 220 grams of a dispersion stabilizer of Example 1 in acetone. The final polymer solution had a Garden-Holdt viscosity of S-J and a total solids content of 35 percent.

Titanium dioxide pigment was encapsulated by dispersing 500 grams of titanium dioxide in 150 grams of the above prepared polymer solution and 100 grams of ethyl acetate by grinding in a ball mill. The pigment grind was then inverted by the slow addition of 428 grams of an aliphatic hydrocarbon having a boiling point of 105°C.

The above encapsulated pigment was further encased in polymer by adding 214 grams of heptane and 214 grams of hexane and heating until a reflux temperature of 78°C. was attained. Over a 3-hour period, 400 grams of methyl methacrylate, 21 grams of the dispersion stabilizer of Example 1, 18 grams of ethylene glycol dimethacrylate, 3.5 grams of methacrylic acid, 3.5 grams of 2-hydroxyethyl ethylene imine and 2.4 grams of azobis-isobutyronitrile were added. The final dispersion was then dried to obtain a fine particle size encapsulated pigment.

According to the provisions of the patent statutes, there is described above the invention and what are now considered to be its best embodiments. However, within the scope of the appended claims, it is to be understood that the invention can be practiced otherwise than as specifically described.

I claim:
1. A method of encapsulating pigments comprising
    1. polymerizing at least one ethylenically unsaturated monomer in a dispersing liquid of aliphatic hydrocarbon solvent in the presence of an active solvent for the polymerized monomer from about 0.2 to about 6 percent by weight of a polymerizable ethylenically unsaturated acid based on the ethylenically unsaturated monomer, from about 0.2 to about 6 percent by weight of an imine having the formula:

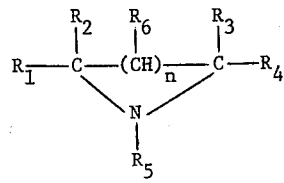

where $R_1$, $R_2$, $R_3$, $R_4$ and $R_5$ are each selected from the group consisting of hydrogen, alkyl, aryl and alkaryl, and $R_6$ is selected from the group consisting of hydrogen and lower alkyl radicals and $n$ is an integer from 0 to 1, based on the ethylenically unsaturated monomer, and from about 1 to about 40 percent by weight based on the ethylenically unsaturated monomer of a dispersion stabilizer comprising a branch copolymer containing two polymeric segments of which one segment is solvated by the dispersing liquid and the second segment is an anchor polymer of different polarity to the first segment and is relatively non-solvated by the dispersing liquid and is capable of anchoring with the polymerized particles of the ethylenically unsaturated monomer, said anchor polymer containing pendant groups which are copolymerizable with ethylenically unsaturated monomers so as to form a pseudo-dispersion, wherein the composition contains from 20 percent solids content and wherein the weight ratio of aliphatic hydrocarbon to active solvent is from about 1:1 to about 1:5;

2. grinding pigments in the composition of step (1); and
3. adding liquid aliphatic hydrocarbon until the composition of step (2) becomes a real dispersion of pigment particles which are encapsulated with a protective coating of polymerized particles of the ethylenically unsaturated monomers.

2. The method of claim 1 wherein the ethylenically unsaturated monomers are co-monomers of methyl methacrylate and other acrylic monomers.

3. The method of claim 1 wherein the polymerizable ethylenically unsaturated carboxylic acid is methacrylic acid.

4. The method of claim 1 wherein the imine is N-2-hydroxyethyl ethylene imine.

5. The method of claim 1 wherein the dispersion stabilizer is formed by graft copolymerizing (a) the reaction product of glycidyl methacrylate and poly-12-hydroxy stearic acid and (b) the reaction product of methyl methacrylate, glycidyl methacrylate and the copolymer product containing pendant epoxy groups is reacted with methacrylic acid.

6. The method of claim 1 wherein the pigments are selected from the class consisting of $TiO_2$, zinc chromate, zinc oxide, aluminum, and carbon black.

* * * * *